(No Model.)

W. L. AURAND & G. F. TRACKLER.
RAIL JOINT

No. 432,812. Patented July 22, 1890.

G. F. Trackler
and
W. L. Aurand.
Inventors

Witnesses by

Attorney

UNITED STATES PATENT OFFICE.

WILLIAM L. AURAND AND GEORGE F. TRACKLER, OF FOREST, OHIO.

RAIL-JOINT.

SPECIFICATION forming part of Letters Patent No. 432,812, dated July 22, 1890.

Application filed March 15, 1890. Serial No. 344,059. (No model.)

*To all whom it may concern:*

Be it known that we, WILLIAM L. AURAND and GEORGE F. TRACKLER, citizens of the United States of America, residing at Forest, in the county of Hardin and State of Ohio, have invented certain new and useful Improvements in Rail-Joints; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in rail-joints; and it consists in the construction and combination of the parts, as will be hereinafter fully set forth, and particularly pointed out in the claims.

Figure 1:
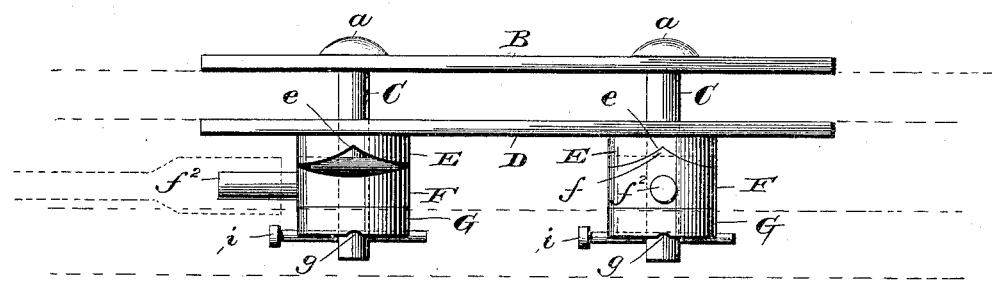
Figure 2:
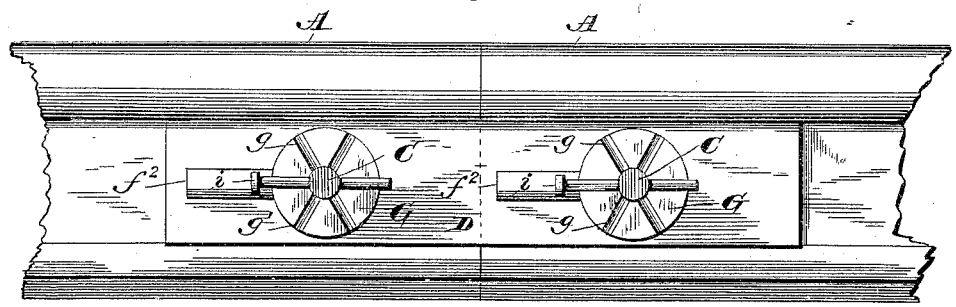
Figure 3:
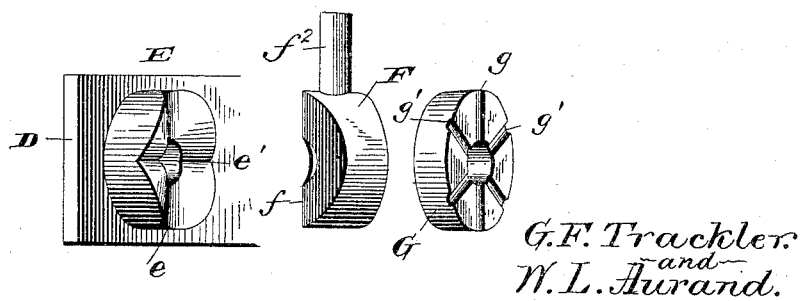

In the accompanying drawings, Figure 1 is a plan view of a rail-joint and fastening devices. Fig. 2 is a side view, and Fig. 3 detail perspective views, of parts detached.

A refers to the rails, which are of ordinary construction, and are provided with the usual bolt-holes, and on one side with a fish-plate B, of ordinary construction, against which the heads $a$ of the securing-pins C bear, the opposite fish-plate D having formed on the outer face thereof two or more bosses E with intersecting grooves or recesses $e$ and $e'$, the vertical recesses $e$ being deeper cut than the others. The walls of the recesses are inclined, as shown, to provide wedge-shaped openings.

F refers to a clamp having a wedge face $f$ and projecting portion $f^2$ from the periphery thereof, which is adapted to enter the socket of a suitable tool and be operated thereby.

G refers to a washer having a plain face, the opposite face presenting a series of recesses $g$ and $g'$ of different depths.

In order to organize the parts, the headed pin C is passed through the opening in the fish-plate B, rail, and opening in the fish-plate D, located at the center of the boss E. The block F is then placed upon the pin, so that its inclined face will engage the boss E, after which the washer G is placed over the end of the pin and secured thereto by a pin $i$ passing through a perforation in the end of the pin C. The washer is pressed snugly in place and turned, so that one of the recesses will be on a line with the perforation in the end of the pin C. When the parts are properly positioned, the projection $f^2$ will be vertical, and by employing a suitable lever having a socket in its end the block F may be given a quarter-turn, so that it will be forced out of the deep-seated recess and lie in the shallow one, thereby tightening all the parts and bringing them snugly together to secure a tight and substantial rail-joint.

It will be observed that by this construction screw-threads are dispensed with and the parts are not liable to become loosened, though should they loosen up they are easily tightened by simply removing the pin $i$ and turning the serrated washer G, so that the pin will lie in one of the recesses of less diameter than that it previously occupied.

We are aware that prior to our invention wedges have been used for forming a tight joint in connection with fish-plates and railroad-rails, and we do not, therefore, claim such, broadly, as our invention; but What we do claim as new, and desire to secure by Letters Patent, is—

1. A rail-joint adapted to be used in connection with a fish-plate of ordinary construction, of a fish-plate having integral bosses with vertical and horizontal recesses formed in the face of said bosses, a block having an inclined face, and an independent washer G, all secured upon the pin C by a removable key, substantially as set forth.

2. In a rail-joint, a fish-plate having bosses E, with vertical and horizontal recesses $e$ and $e'$, a block F, having an inclined face and a projecting portion for turning said block, a washer G, secured upon the pin C, to form a bearing for the plain face of the block F, substantially as set forth.

3. In combination with a fish-plate D, having an integral projecting portion or boss with a vertical recess of greater depth than the horizontal recess, the walls of said recesses being inclined, a block F, having an inclined face, said block being all retained upon the pin C by a removable key, substantially as set forth.

4. The combination, in a rail-joint, of a pin C, a turning block having a wedge-shaped face adapted to abut against inclined faces formed on the fish-plate adjacent thereto, a retaining-washer G, the face of which is provided with a series of recesses of different depths, and a locking-pin $i$, the parts being organized substantially as shown and set forth.

In testimony whereof we affix our signatures in presence of two witnesses.

WILLIAM L. AURAND.
   GEORGE F. TRACKLER.

Witnesses:
 D. F. FRYER,
 HENRY LEASE.